(12) United States Patent
Woo et al.

(10) Patent No.: US 7,370,152 B2
(45) Date of Patent: May 6, 2008

(54) MEMORY CONTROLLER WITH PREFETCHING CAPABILITY

(75) Inventors: Steven C. Woo, Saratoga, CA (US); Bradley A. May, San Jose, CA (US); Liewei Bao, Westford, MA (US)

(73) Assignee: Rambus Inc., Los Altos, CA (US)

( * ) Notice: Subject to any disclaimer, the term of this patent is extended or adjusted under 35 U.S.C. 154(b) by 377 days.

(21) Appl. No.: 10/881,413

(22) Filed: Jun. 29, 2004

(65) Prior Publication Data

US 2005/0289301 A1    Dec. 29, 2005

(51) Int. Cl.
*G06F 12/00* (2006.01)
(52) U.S. Cl. .................... 711/137; 711/144
(58) Field of Classification Search ............ None
See application file for complete search history.

(56) References Cited

U.S. PATENT DOCUMENTS 6,237,074 B1 * 5/2001 Phillips et al. .............. 711/213
2003/0229762 A1 * 12/2003 Maiyuran et al. .......... 711/137

OTHER PUBLICATIONS

Varma, A., et al., "A Class of Prefetch Schemes for On-Chip Caches," *Proceedings of the 19th Int'l Symposium on Computer Architecture*, May 1992.
Mowry, T.C., "Tolerating Latency Through Software-Controlled Data Prefetching," Ph.D. thesis, Stanford University, Mar. 1994.
Goode, G.S., "Stache: Exploring the Benefits of Predictive Prefetching for Instruction of Caches," 1991.

* cited by examiner

*Primary Examiner*—Brian R. Pough
*Assistant Examiner*—Horace L. Flournoy
(74) *Attorney, Agent, or Firm*—Morgan, Lewis & Bockius LLP (57) ABSTRACT

A memory controller monitors requests from one or more computer subsystems and issues one or more prefetch commands if the memory controller detects that the memory system is idle after a period of activity, or if a prefetch buffer read hit occurs. In some embodiments, results of a prefetching operations are stored in a prefetch buffer configured to provide an automatic aging mechanism, which evicts prefetched data from time to time. The prefetched data in the prefetch buffer is released and sent back to the requester in order with respect to previous memory access requests.

33 Claims, 7 Drawing Sheets

MEMORY CONTROLLER WITH PREFETCHING CAPABILITY

TECHNICAL FIELD

The disclosed embodiments relate generally to computer memory systems and methods, and in particular to a memory controller with prefetching capability.

BACKGROUND

As processing speeds continue to outpace memory speeds, memory access latencies continue to become more of a bottleneck to improving system performance. One solution for reducing memory access latencies is to prefetch and store requested data before it is needed by the requester. Prefetching is a mechanism that has been employed by central processing units (CPUs) to gather data into CPU caches before the data is needed by the CPU. Since the data resides locally in the CPU cache, the CPU need not wait for the data to be fetched from memory. Thus, incorporating prefetching into the CPU can dramatically increase system performance if the hit rate in the cache is high (i.e., if prefetching substantially increases the frequency with which data needed by the CPU is found in the CPU's cache).

While CPU prefetching has advantages, it has drawbacks as well. For example, when a CPU issues a prefetch command, it typically does not know if other subsystems are concurrently accessing the same memory. For this reason, prefetches issued by a CPU can interfere with memory access requests from other subsystems, delaying these and subsequent memory access requests.

SUMMARY

A memory controller is configured to monitor requests from one or more computer subsystems and to issue one or more prefetch commands when it detects that the memory system is idle. In some embodiments, a prefetch can be issued when a prefetch buffer read hit occurs. In some embodiments, results of prefetching operations are stored in a prefetch buffer configured to provide an automatic aging mechanism, which evicts prefetched data from time to time. When a memory request matches data in the prefetch buffer, the prefetched data is released from the prefetch buffer and sent back to the requester. In some embodiments, returning the prefetched data to the requester may be delayed until the servicing of earlier memory access requests is completed by the memory controller.

DESCRIPTION OF EMBODIMENTS

System Overview

Figure 1:
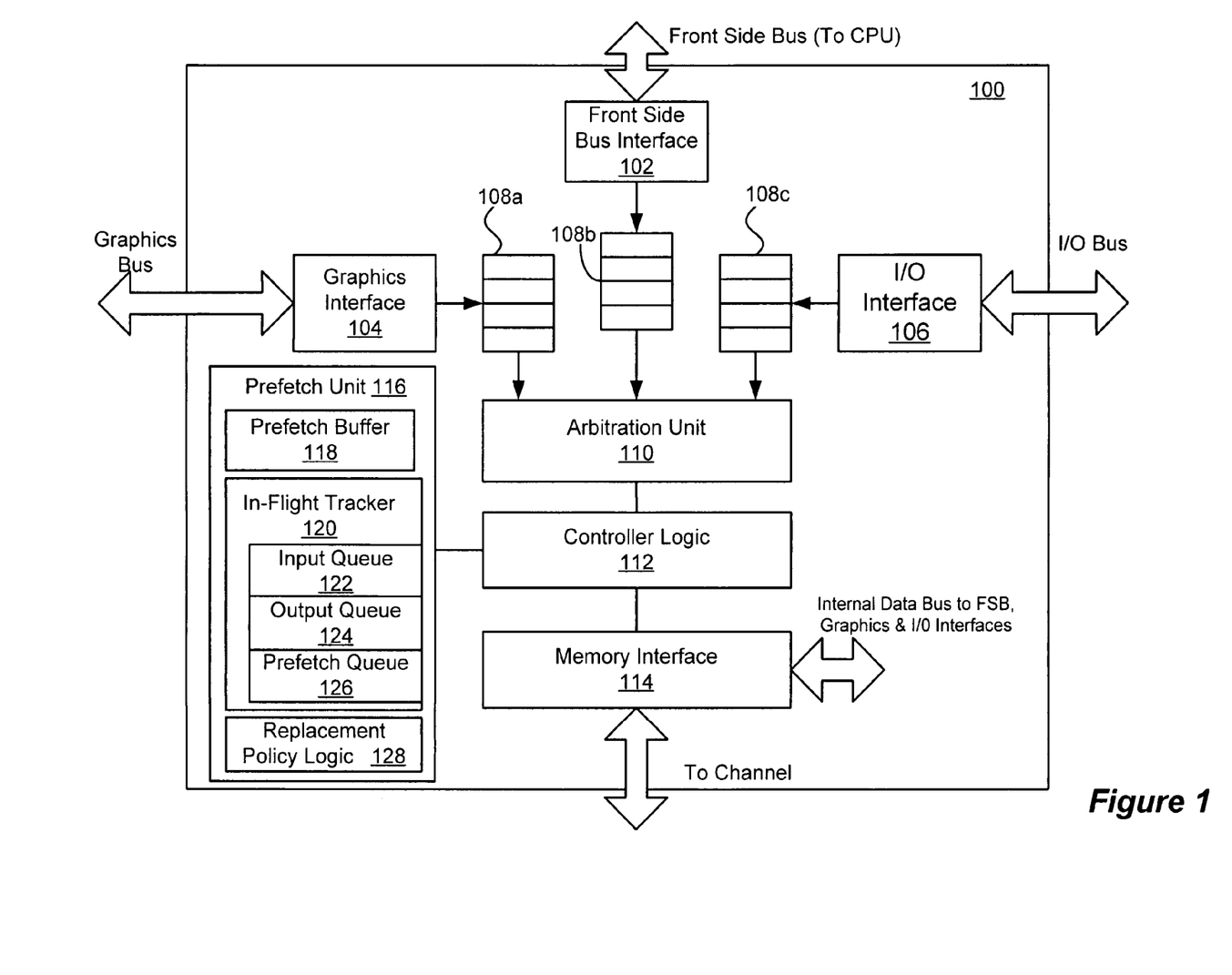
FIG. 1 is a block diagram of a memory controller having prefetching capability.

FIG. 1 is a block diagram of a memory controller 100 having prefetching capability. In some embodiments, the memory controller 100 generally includes a front side bus (FSB) interface 102 coupling the memory controller to a CPU (or more specifically to a CPU's memory bus), a graphics interface 104, an I/O interface 106, queues 108a, 108b and 108c, an arbitration unit 110, controller logic 112, a memory interface 114, and a prefetch unit 116.

During operation, memory access requests are received via interfaces 102, 104 and 106, and stored in queues 108. The memory access requests stored in the queues 108 are issued by the arbitration unit 110 using conventional arbitration techniques (e.g., round-robin, priorities, etc.). The selected memory access request is granted by the arbitration unit 110 and forwarded to the controller logic 112. An N-bit address (e.g., a 28-bit, 32-bit or 64-bit address) is then decoded to access a particular bank, row and column of a particular memory device. A sample address mapping is shown in Table I below:

TABLE I

| Sample Address Mapping | | | |
| --- | --- | --- | --- |
| Bit N-1 | | | Bit 0 |
| Device ID | Row | Bank | Column |

The Device ID field of the address contains a value indicative of a particular memory device or a rank of memory device(s) in a memory system, the Bank field contains a value indicative of a bank within the memory device identified by Device ID, and the Row and Column fields contain values that identify a specific set of locations in the memory bank associated with the Device ID and Bank.

Prefetch Unit

The prefetching capability of the memory controller 100 is provided by the prefetch unit 116, which generally includes a prefetch buffer 118, an in-flight tracker 120 and replacement policy logic or circuitry 128. The prefetch unit 116 monitors memory access requests from computer subsystems and issues prefetches when it detects that the memory system is idle after a period of activity. In some embodiments, the absence of memory access request signals from the arbitration unit 110 indicates that the memory system is idle. In other embodiments, the controller logic 112 receives an idle signal from the arbitration unit 110, indicating that the memory system is idle (e.g., a signal indicating when all queues 108 are empty).

More specifically, the queues 108 may be configured to generate empty signals when they are empty, and those signals may be logically ANDed by the arbitration unit 110. Alternately, the arbitration unit 110 may be configured to "look into" the queues 108 to determine if they are empty, for example by comparing the read and write pointers of each queue 108 to determine if they are equal. When the read and write pointers of each of the queues 108 are equal, the queues are empty. The arbitration unit 110 may also be configured to generate and to provide to the controller logic 112 a signal indicating a memory system idle condition. An idle condition can also be detected when a received request is a prefetch hit and there are no other items in the queues 108. Prefetch hits are explained below. A prefetch hit does not require use of the main memory channel, corresponding to the channel at the bottom of FIG. 1, and thus does not negate an idle state of the memory system. More generally, the memory controller 100 may be configured to detect an memory system idle state by detecting that the memory controller is not sending over the memory channel any transactions corresponding to received memory access requests.

The prefetch unit 116 also monitors memory access requests for hits on the prefetch buffer 118. After the memory controller 100 responds with the prefetched data, the prefetched data is evicted from the prefetch buffer 118, thus freeing up memory in the prefetch buffer 118 for more prefetched data. In some embodiments, the prefetched data may remain in the prefetch buffer, and the age of the prefetch data may be reset to prevent this data from being evicted in the near future.

In some embodiments, if a normal memory access command is received by the memory controller (e.g., from a CPU), and the next memory access cycle is unused by the CPU and other devices (if any) coupled to the memory controller, the next sequential memory address in a memory page is prefetched using a prefetch address generator. In some embodiments, if the next sequential memory address goes across a certain boundary (such as a page boundary), the memory address being prefetched wraps to the beginning of the unit of data (such as the beginning of the page). In some embodiments, a prefetch is issued in an unused memory access cycle only if the preceding memory access cycle was a Read operation. The prefetch address generator is preferably located in the controller logic 112. In some circumstances, if a request for data matches a pending prefetch, the prefetched data is not stored in the prefetch buffer 118 and instead the data is returned directly to its requester. Otherwise, the prefetched data is stored in the prefetch buffer 118, which in some embodiments is implemented in cache memory as M, N-bit entries, as described more fully with respect to FIG. 3.

In-Flight Tracker

In some embodiments, the in-flight tracker 120 includes an input queue 122, an output queue 124 and a prefetch queue 126. Each queue has a number of entries (e.g., 16 entries), a read pointer (e.g., 4 bits) and a write pointer (e.g., 4 bits). The valid entries in each queue are those located between the read pointer and write pointer. When the read and write pointers for a queue are equal, that queue is empty (i.e., contains no valid entries).

Figure 2:
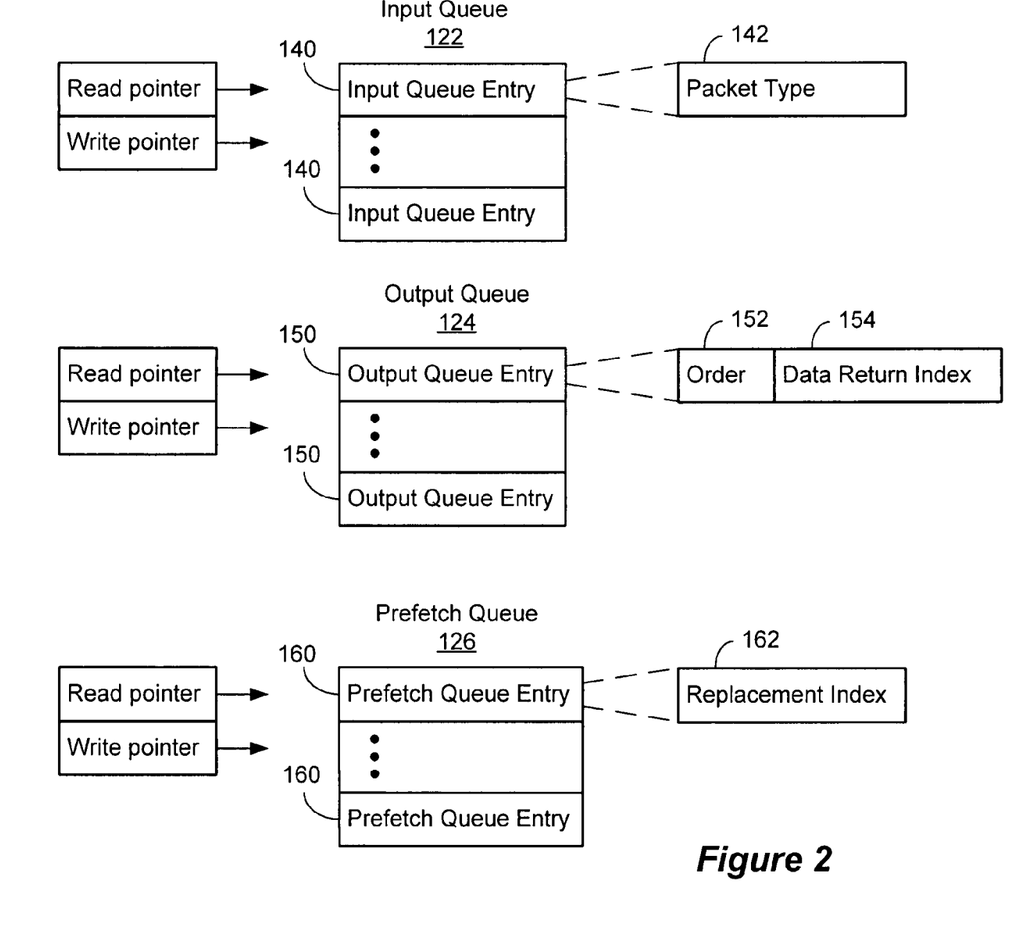
FIG. 2 depicts block diagrams of an input queue, and output queue and a prefetch queue.

Referring to FIG. 2, each entry 140 of the input queue 122 includes at least one data field 142 containing information indicative of the type of packet issued by the prefetch unit 116 (prefetch packet) or the CPU or other requestor (normal read packet). In some embodiments, the data field 142 includes a 1-bit Packet Type flag indicating whether a normal read packet issued (Packet Type=1) or whether a prefetch packet issued (Packet Type=0).

The term "packet" is used herein to mean an operation or command issued by the prefetch unit 116 or a CPU or the like, or a response such as data. The term "packet" is used to mean a message transmitted over a channel, with regard to the specific format of the message.

Each entry 160 of the prefetch queue 126 includes an N-bit Replacement Index 162. The N-bit Replacement Index 162 includes one hot bit, which corresponds to an entry in the prefetch buffer 118 that will be used to store prefetch data. The replacement policy logic 128 identifies a "replacement entry" in the prefetch buffer 118 that is available to store prefetch data and updates the Replacement Index (of an entry in the prefetch queue) accordingly.

Each entry 150 of the output queue 124 includes a N-bit Data Return Index 154. The N-bit Data Return Index includes one hot bit, which corresponds to an entry in the prefetch buffer 118 containing data to be returned to its requestor. Each output queue entry also includes an Order field 152, which contains a snapshot of the write pointer of the input queue 122 when a prefetch buffer read hit occurs. In other words, when a normal read results in a hit on a previously issued prefetch, an entry 150 is created in the output queue 124 that (A) identifies the same prefetch buffer entry as the matching prefetch operation, and (B) identifies (in the Order field 152) the input queue entry 140 for the current normal read packet. The Order field 152 is used in a packet response reordering process described below. Both this entry and the prefetch queue entry 160 corresponding to the matching prefetch operation identify the same prefetch buffer entry 202 if the hit data is still in flight. (The prefetch queue entry 160 is removed from the prefetch queue when its data is returned.)

Figure 3:
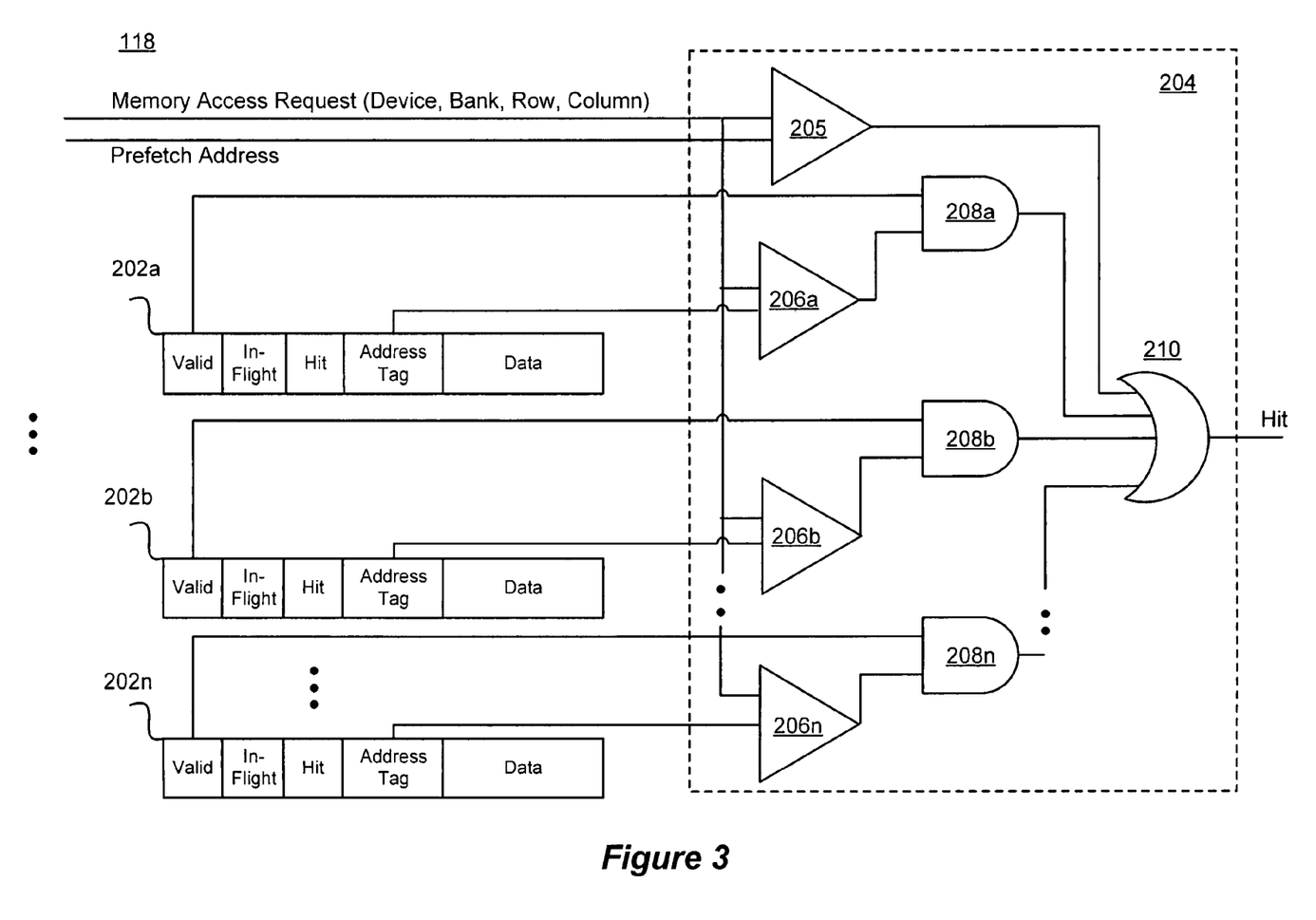
FIG. 3 is a block diagram of the prefetch buffer shown in FIG. 1.

Referring to FIG. 3, each entry 202 of the prefetch buffer 118 includes a Valid bit (indicating if the entry contains valid data), an In-Flight flag, a Hit flag, an Address Tag, and a data field. The Address Tag represents the address of the data stored in the entry. The In-Flight flag indicates whether the memory controller is in the process of obtaining the data for the entry, and the Hit flag indicates whether a pending normal read operation (e.g., from the CPU or other requestor) is requesting the data at the address specified by the Address Tag.

Referring again to FIG. 2, the read and write pointers for the input, output and prefetch queues 122, 124 and 126 are used as follows. The write pointer for each queue points to the entry currently being written, and advances monotonically as additional entries are written into the queue. When the end of the queue is reached, the write pointer wraps around to the beginning of the queue. An input queue entry 140 is written whenever a normal read packet is issued by the memory controller 100, or a prefetch packet is issued. A prefetch queue entry 160 is written for each prefetch packet. The prefetch queue entry 160 identifies the prefetch buffer entry to be used to store the prefetch data. An output queue entry 150 is written when a normal read operation matches a previously issued, valid prefetch operation. In other words, an output queue entry 150 is written when (A) the read address of the normal read packet matches the Address Tag of a valid prefetch buffer entry 202 (i.e., matches the read address for a previously issued prefetch that is still valid), an output queue entry is written, or (B) the read address of the normal read packet matches the prefetch address of a prefetch packet that is being issued at present (see 205 in FIG. 3). In case B, the prefetch packet that is being issued is one memory cycle earlier than the normal read packet if it were to be issued, which improves latency by one cycle. The output queue entry 150 identifies the same prefetch buffer entry 202 as the matching prefetch queue item, and also identifies the input queue item for the normal read packet that resulted in the creation of the output queue entry 150.

The read pointer for each queue also advances monotonically, in the same direction as the write pointer, and wraps around to the beginning of the queue when the read pointer advanced beyond the end of the queue. The read pointer of the input queue 122 advances when the processing of a normal read packet is completed or the processing of a prefetch packet is completed. The input queue read pointer identifies what read packet (normal or prefetch), if any, is scheduled for output processing by the memory controller 100. The read pointer of the prefetch queue 126 advances when the processing of a prefetch packet is completed. The read pointer of the prefetch queue 126 identifies what prefetch packet, if any, is scheduled for output processing by the memory controller 100. The read pointer of the output queue 124 advances whenever the data identified by an output queue entry is returned to a requester. If there are no additional entries in the output queue 124, the read pointer advances to match the write pointer, which is the condition indicating that the output queue 124 is empty.

Note that when a prefetch data packet is returned, the read pointer of the prefetch queue 126 identifies where the prefetch packet should be stored in the prefetch buffer 118. However, it is possible that the prefetch data packet should be returned to the requestor directly. Therefore, the prefetch queue entry pointed to by its read pointer is compared with the output queue entry pointed to by the read pointer of the output queue 124. If they match, the prefetch data for the top entry of the output queue 124 is available for direct return to its requester.

Packet Response Reordering

Some requesters may need data to be returned in the order requested (e.g., due to CPU ordering requirements). Because a response from a hit on the prefetch buffer 118 has a shorter latency than accessing memory devices (e.g., DRAM) in the memory system, it is possible that prefetch data could be returned ahead of data returned from system memory even though the underlying memory requests were in the opposite order. To ensure that data is returned to a requestor in proper order, data associated with a prefetch buffer read hit is "locked" in the prefetch buffer 118 until all previous memory access requests made to the system memory return data to the requestor. Once all previous memory access requests have returned data to the requestor, the data requested from the prefetch buffer 118 is served to the requestor. Note that locking data in the prefetch buffer 118 to preserve the order of memory access requests saves space in the memory controller 100 since a dedicated reorder buffer is not required to facilitate packet response reordering.

In some embodiments, locked prefetch buffer hits are stored at the top of the output queue 124 until one or more previous memory reads are completed. The order field 152 of the top entry 150 in the output queue 124 points to an entry in the input queue 122. The read pointer of the input queue 122 points to an entry in the input queue 122. As long as none of the input queue entries between the above mentioned entries, inclusive, contain a packet type (data field 142, FIG. 2) corresponding to a normal read packet, the prefetch data can be returned to its requestor if it is available, or as soon as the data becomes available. For example, if the order field 152 matches the input queue's read pointer, there are no entries between the two, and the prefetch data corresponding to the current output queue entry is returned if that data is in the prefetch buffer or is in the process of being received from memory.

The prefetch unit 116 knows that data from at least one prefetch hit is locked if the read pointer and write pointer of the output queue 124 do not match (i.e., do not point to the same entry). In some embodiments, a prefetch buffer read hit is unlocked from the output queue 124 when two conditions are met. First, any in-flight normal read packets that were issued before the prefetch buffer read hit occurred are returned to their requesters. Second, the data associated with the prefetch buffer read hit is available to be returned to the requestor.

For ease of explanation, the term "current output queue entry" means the output queue entry identified by the read pointer of the output queue. Similarly, the "current input queue entry" is the input queue entry identified by the read pointer of the input queue. Also, the "top" of the output queue means the entry identified by the output queue read pointer.

The following steps or operations are performed by the prefetch buffer with respect to the entry at the top of the output queue 124, to determine if it is time to return the prefetch data corresponding to that output queue entry to the requester. First, the Order field 152 of the current output queue entry 150 is compared with the read pointer of the input queue 122. If these two pointers match, then there are no normal read packets that need to be serviced prior to the normal read packet corresponding to the current output queue entry. In this case, the prefetch data is returned to the requester if it is available, or as soon as it becomes available. The logic for determining whether the prefetch data is available is discussed below.

When the Order field 152 of the current output queue entry 150 does not match the read pointer of the input queue 122, the input queue contains entries for at least one normal read packet or prefetch packet prior to the entry corresponding to the current output queue entry 150. If the input queue contains at least one normal read packet entry that is prior to the entry corresponding to the current output queue entry 150, then returning the data corresponding to the current output queue entry must be deferred. Otherwise, if there are no such intervening normal read packet entries in the input queue, the data corresponding to the current output queue entry is returned if that data is in the prefetch buffer or is in the process of being received from memory.

In some embodiments, the prefetch unit 116 (FIG. 1) is configured to handle the situation in which the Order field 152 does not match the input queue's read pointer by including logic to check the Packet Type field of the input queue entries between the input queue entry identified by the read pointer of the input queue and the input queue entry identified by the Order field of the current output queue entry. If all these entries (excluding the input queue entry identified by the Order field of the current output queue entry) are prefetch packets, the first condition is satisfied. In other embodiments, the prefetch unit is configured to handle this situation by deferring the return of the data specified by the current output queue entry until the read pointer of the input queue matches the Order field of the current output queue entry. Since the read pointer of the input queue is automatically advanced from one normal read packet entry to the next in the input queue, if the intervening input queue entries are all fetch packet entries, the processing of the output queue entry is deferred only by the number of cycles required to advance the read pointer of the input queue to the next normal read packet entry of the input queue. In some embodiments, when the input queue's read pointer is being advanced, it moves one entry per clock cycle until it either reaches a normal read packet entry or it reaches the write pointer (indicating that the input queue is empty).

Figure 5:
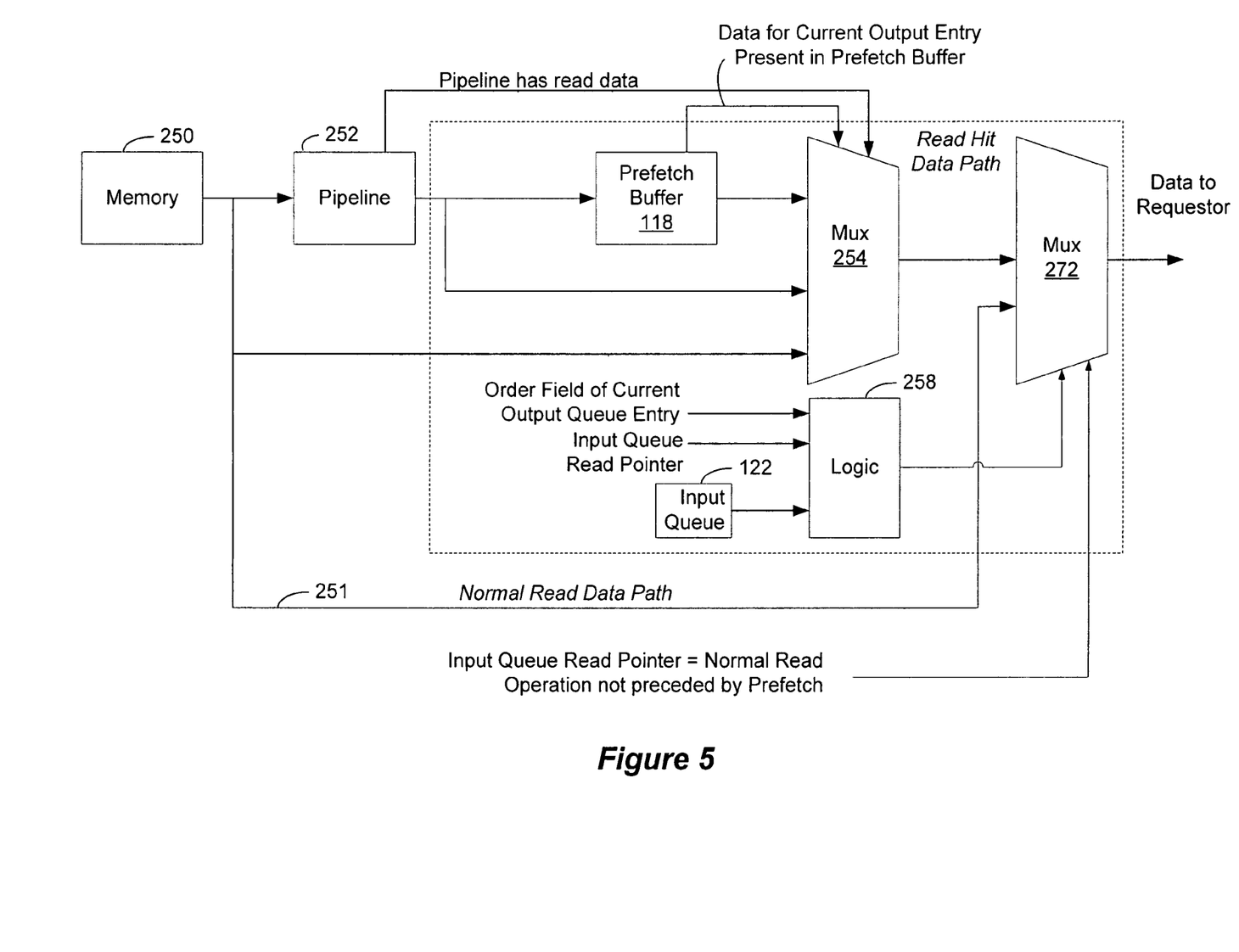
FIG. 5 is a block diagram of data pipeline paths for providing read data in response to a read operation.

Once the first condition has been met (i.e., there are no pending normal read packets that were issued prior to the read hit corresponding to the current output queue entry), there are three possible sources of the data for the current output queue entry. Referring to FIG. 5, prefetched data flows from memory 250 through a pipeline 252 of the memory controller to the prefetch buffer 118. When there is a read hit, the data for the specified address can be obtained from the prefetch buffer 118 if the data for the current output entry is present in the prefetch buffer 118. Alternately, if the data is in the pipeline 252, the data can be obtained directly from an output of the pipeline 252. In addition, in some embodiments the data for the read hit can be obtained from an input to the pipeline 252, thereby bypassing the pipeline 252. To do this, a multiplexer 254 receives data and control inputs from the prefetch buffer 118, and from the input and output ports of the memory controller pipeline 252. In other embodiments, the multiplexer 254 may have fewer inputs (e.g., from the memory output 250 and from the prefetch buffer 118). The multiplexer 254, when enabled, outputs data from the prefetch buffer 118, the pipeline output or pipeline input in accordance with control signals received from the prefetch buffer 118 and pipeline 252. Logic 258 checks all input queue entries between the entry pointed to by the Order field of the current output queue entry and entry pointed to by the input queue's read pointer. If none of these input queue entries are normal read packet entries, multiplexer 272 is enabled by logic 258 so that the data for the prefetch packet on top of the output queue can be returned to its requestor when the hit data becomes available and multiplexer 254 is enabled.

Still referring to FIG. 5, when the read pointer to the input queue points to a normal read packet entry for which there is no corresponding prefetch (i.e., the Order field of the top entry of the output queue does not match the read pointer of the input queue, and the Packet Type of the current input queue entry corresponds to a "normal read packet"), data is provided to the requestor by a second data path. In some embodiments, the data for the read operation is received from memory 250 output. The read data is provided to the requester, for example via multiplexer 272. Operation of the multiplexer 272 is enabled when a read data packet is received (from the memory 250) and the read pointer to the input queue 122 points to a normal read packet entry for which there is no corresponding prefetch.

To determine whether the second condition (for completing processing of the current entry at the top of the output queue) is met, the In-flight flag located in the entry of the prefetch buffer 118 identified by the current entry of the output queue 124 (as identified by the read pointer of the output queue) is checked. If the In-Flight flag is clear (i.e., In-Flight=0), then the read data is present in the prefetch buffer entry identified by the current entry of the output queue, and thus the second condition is met. On the other hand, if the In-Flight flag is set (i.e., In-flight=1), then the read data is routed through the multiplexer 254 from the memory controller's pipeline, thereby satisfying the second condition. See the explanation, above, of FIG. 5. In some embodiments, a third way to satisfy the second condition occurs when the read data arrives at multiplexer 254 directly from memory 250 (FIG. 5).

Prefetch Buffer

FIG. 3 is a block diagram of the prefetch buffer 118 shown in FIG. 1. The prefetch buffer 118 includes entries 202a, . . . , 202n and hit detection logic 204. In some embodiments, the prefetch buffer 118 includes 32 entries each including three status flags (Valid, In-flight, Hit), an Address Tag and data. For example, in one embodiment the address tag is 28 bits and the data is 512 data bits (i.e., 64 bytes). The number of bits in the address tag and data fields will vary from one implementation to another. In addition, other embodiments can include more or fewer fields (fixed or variable), which can include more or less bits than the embodiment shown in FIG. 2.

The Address Tag in entry 202 stores the prefetch address that has been issued by the prefetch unit 116. The Address Tag is initialized when a prefetch is issued by the prefetch unit 116. In some embodiments, the Address Tag includes a 28-bit address including Device, Bank, Row and Column fields of the memory device associated with the memory access request. For example, the 28 bits of the Address Tag can be allocated as follows: 32 devices (5 bits), 32 banks per device (5 bits), 2048 rows per bank (11 bits) and 128 columns per row (7 bits). The Address Tag is checked by the prefetch unit 116 to make sure there is only one unique copy of the prefetch data in the prefetch buffer 118. Before a prefetch can be issued, all valid Address Tags in the prefetch buffer 118 are compared with the prefetch address by hit detection logic 204. The Address Tag is valid only if its corresponding Valid flag is set (i.e., Valid=1). If a match is found (indicating that there is more than one copy of the prefetch in the prefetch buffer 118), then the prefetch is aborted. During operation, the valid Address Tags are compared with the incoming memory access request. If a match is found, a prefetch (read or write) hit occurs.

The prefetch buffer 118 includes an entry for storing the prefetch data referenced by the Replacement Index 162 (FIG. 2) of each valid entry in the prefetch queue 126. If an entry 202 of the prefetch buffer 118 gets a prefetch read hit (i.e., a normal read packet matches the tag in the entry 202), the data associated with the entry 202 will be returned to the requestor. If an entry 202 of the prefetch buffer 118 data never gets a prefetch read hit, the associated data will not be used and will be discarded via an automatic aging mechanism.

The Valid flag indicates whether the Address Tag in the prefetch buffer 118 entry 202 is valid or not. The Valid flag of a prefetch buffer entry is initialized when a prefetch is issued. In some embodiments, if the prefetch is a read hit or a write hit (or a partial-write hit), the Valid flag is initially set to "0"; otherwise, it is set to "1." A prefetch is a read hit or write hit if the prefetch operation is followed by a normal read or write operation having a matching address. In some embodiments, the Valid flag of a prefetch buffer entry is initially set (i.e., to "1") when a prefetch is issued, and is then cleared (i.e., Valid flag=0) when a prefetch read hit occurs.

The In-flight flag specifies whether the associated data of the prefetch buffer entry 202 is still in-flight from memory. In some embodiments, the In-flight flag is initially set to "1" when a prefetch is issued. The In-flight flag is cleared to "0" when the prefetch data is received from the memory device associated with the memory access request, thereby indicating that the prefetch data is available in the prefetch buffer entry.

The Hit flag indicates whether the prefetch buffer entry 202 corresponds to a read operation. A hit occurs when the tag of a prefetch buffer entry 202 matches the address of a read operation. This condition causes the prefetch buffer's logic to set the Hit flag of the corresponding entry to "1". Normally, the Hit flag is initially set to "0" when a prefetch is first issued. However, in some embodiments if a corresponding read operation is received before the prefetch buffer entry is updated, then the Hit flag is initially set to "1".

For instance, a read operation having the same address as a prefetch operation may occur immediately after the prefetch is issued. In some embodiments, the Hit flag is cleared (e.g., set to "0") when the prefetch data is sent to its requestor.

Hit Detection Logic

As shown in FIG. 3, the hit detection logic 204 generates a prefetch hit signal, which notifies the prefetch unit 116 that a prefetch buffer read hit has occurred. In some embodiments, the hit detection logic 204 includes comparators 205 and 206a, ..., 206n, AND gates 208a, ..., 208n and an OR gate 210. Other embodiments can include other combinations of logic devices containing more or less comparators 206, AND gates 208 and OR gates 210, in various combinations using conventional logic design techniques. The hit detection logic 204 can also be implemented in software, in whole or in part, using conventional software techniques.

In operation, the comparator 205 receives and compares an incoming memory access request address with the prefetch address of a prefetch packet that is being issued. If the addresses match, then a prefetch hit is indicated by the hit detection logic via OR gate 210. The remaining comparators 206a, 206b, ..., 206n compare the incoming memory access request address to the Address Tags in the prefetch buffer entries 202a, 202b, ..., 202n, respectively. The results of these comparisons (e.g., binary values output by each of the comparators 206) are provided as inputs to the AND gates 208a, 208b, ... 208n, respectively, together with the Valid flags for these same entries. The results of the bitwise AND operations are provided as inputs into the OR gate 210. Thus, if any of the entries has an Address Tag that matches the incoming memory access request and includes a set Valid flag, then a prefetch (read or write) hit is indicated.

Automatic Aging Mechanism

Figure 4:
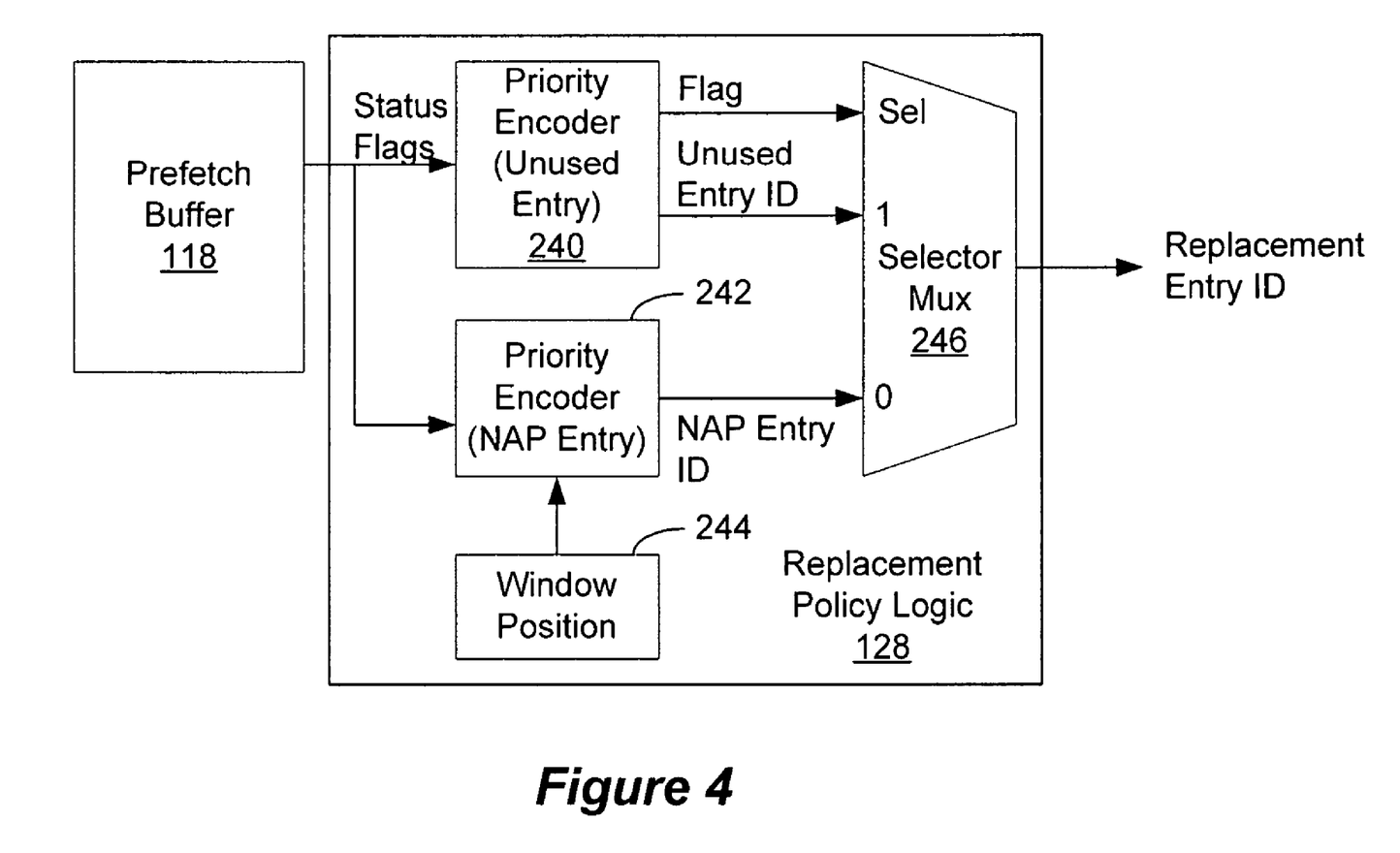
FIG. 4 is a block diagram of replacement policy logic.

In some embodiments, the prefetch buffer 118 is governed by an automatic aging mechanism, which is implemented by the replacement policy logic 128. An embodiment of the replacement policy logic 128 is shown in FIG. 4. The replacement policy logic inspects the status flags of the prefetch buffer entries and, based on that information, identifies a replacement entry. The identified replacement entry is the entry of the prefetch buffer that is used to store data for a next prefetch operation. This mechanism ensures that prefetched data is eventually evicted from the buffer 118, and also ensures that identified replacement entry is either an unused entry, or an entry that does not contain data required by a normal read operation that is currently pending in the memory controller. As described below, a rotating windowing mechanism is used in some embodiments when identifying the replacement entry.

Referring to FIG. 4, an embodiment of the replacement policy logic 128 includes two priority encoders 240, 242, window position logic 244 for identifying and updating a window function (i.e., identifying a subset of the prefetch buffer entries). In some embodiments, the three status flags Valid, In-flight and Hit of the prefetch buffer entries are examined by the two priority encoders 240, 242 to identify unused entries and nap entries in the prefetch buffer 118. Nap entries are entries corresponding to prefetch operations that have completed, and thus have data stored in an entry of the prefetch buffer, but which have not yet been the subject of a read hit or write hit. When there are no unused entries in the prefetch buffer, one of the nap entries is selected for reuse.

Table II shows a mapping of the status flags to the entry status values of Unused, Nap and Used. The first priority encoder 240 identifies an unused entry of the prefetch buffer, if any, and also generates a flag to indicate whether any unused entries were found. In some embodiments, the first priority encoder 240 always selects an unused entry, for example, the highest or lowest unused entry (if any). The second priority encoder 242 identifies a nap entry within the window of prefetch buffer entries identified by window position logic 244. In some embodiments, the second priority encoder 242 always selects the highest or lowest nap entry within the identified window. In some embodiments, the window position logic 244 identifies a set of M (e.g., 16) prefetch buffer entries, and automatically advances the window by N entries (e.g., 11) each time that the replacement policy logic 128 is used to identify a replacement entry.

TABLE II

| Status/Flags | Prefetch Buffer Entry Status | | |
| --- | --- | --- | --- |
| | Valid | In-fight | Hit |
| Unused | 0 | 0 | 0 |
| Nap | 1 | 0 | 0 |
| Used | Don't Care | 1 | Don't Care |
| Used | Don't Care | Don't Care | 1 |

If there is at least one unused entry available in the prefetch buffer 118, the flag output by the first priority encoder 240 is set to True (or 1), which causes the multiplexer 246 to output the identifier of the unused entry identified by the first priority encoder 240. If there are no unused entries in the prefetch buffer 118, the flag output by the first priority encoder is set to False (or 0). This causes the multiplexer 246 to output the identifier of the nap entry identified by the second priority encoder 242. The entry identified by the output of the multiplexer 246 is used as the replacement entry for the next prefetch operation. The multiplexer 246 outputs a replacement vector ID which is stored in the prefetch queue entry corresponding to the next prefetch operation.

To select a nap entry, a window having a fixed width is selected by window position logic 244. The width is selected to ensure that the window includes at least one nap entry. A vector of nap entries is bitwise ANDed with a window vector to get a nap masked vector. The right most entry in the nap masked vector is selected as the replacement entry by priority encoder 242. The window is moved to the right each time a prefetch is issued, using a predetermined step size to ensure that new nap entries will be considered for the next prefetch.

System Operation

Figure 6:
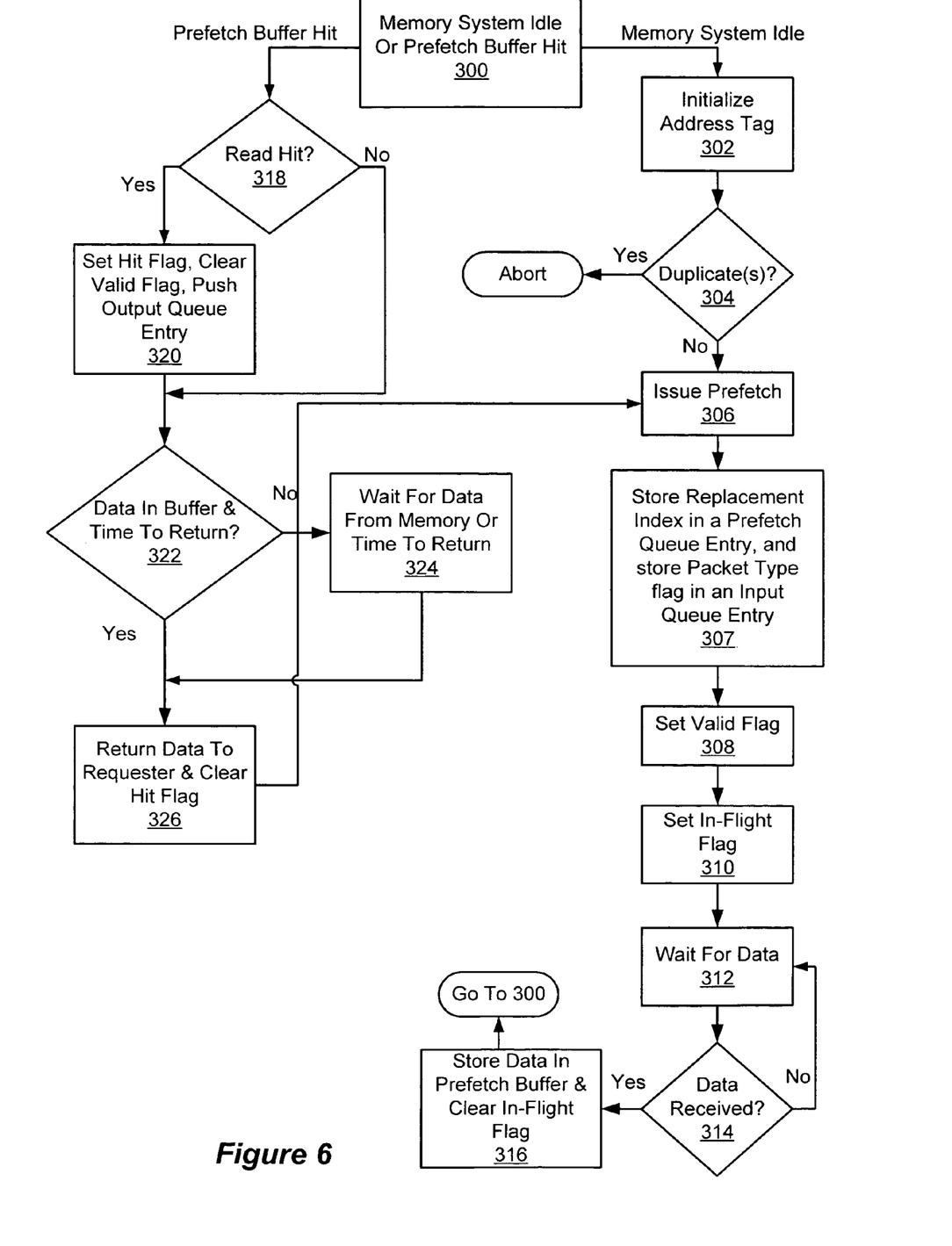
FIG. 6 is a flow diagram of a prefetching process for the prefetch unit shown in FIG. 2.

FIG. 6 is a flow diagram of a prefetching process for the prefetch unit 116 of FIG. 1. The memory controller 100 prefetches if the memory system is idle (300). In some embodiments, the memory controller also initiates a prefetch when a prefetch buffer read hit occurs. If the memory system is idle, then the Address Tag in a replacement entry 202 of the prefetch buffer 118 is initialized (e.g., to an address produced by a prefetch address generator in the controller logic 112) (step 302). Next, the Address Tag is compared against other Address Tags in the prefetch buffer 118 to determine if any duplicate entries 202 exist. If a duplicate entry 202 exists (step 304), then the prefetch operation is aborted. If no duplicate entry 202 exists (step 304), then a prefetch is issued (step 306) by the prefetch unit 116. The replacement index for the prefetch is stored in a prefetch queue entry and the packet type for the prefetch is stored in an input queue entry (step 307). Furthermore, the Valid Flag (of the prefetch buffer entry for the prefetch) is set 308, the In-flight Flag is set (step 310). Then the prefetch unit 116 waits (step 312) for the prefetch data to be returned from memory. After the prefetch data is received from memory (step 314), the prefetch data is stored (step 316) by the prefetch unit 116 in the prefetch buffer 118 and the In-Flight flag is cleared (step 316) (i.e., In-Flight=0). In some embodiments, the prefetched data is stored in a replacement entry 202 in the prefetch buffer 118, which corresponds to a one hot bit in the Replacement Index of the prefetch queue entry for the prefetch.

If a prefetch read hit occurs 318, then the prefetch unit 116 sets the Hit flag and clears the Valid flag and pushes an output queue entry onto the output queue (step 320). If the corresponding prefetch data is in the prefetch buffer 118 and all higher priority memory access requests have been fully processed (step 322), then the prefetch data is returned to its requestor and the Hit flag is cleared (step 326). Otherwise, the memory controller waits to receive the read data from memory, or for all higher priority memory access requests to be fully processed (step 324), and then the prefetch data is returned to its requestor. In some embodiments, the prefetched data to be returned to a requestor is stored in the entry 202 of the prefetch buffer 118 identified by the Data Return Index of the current output queue entry. As explained above with reference to FIG. 5, in some circumstances the prefetched data may be routed directly to the requestor without being stored in the prefetch buffer.

Figure 7:
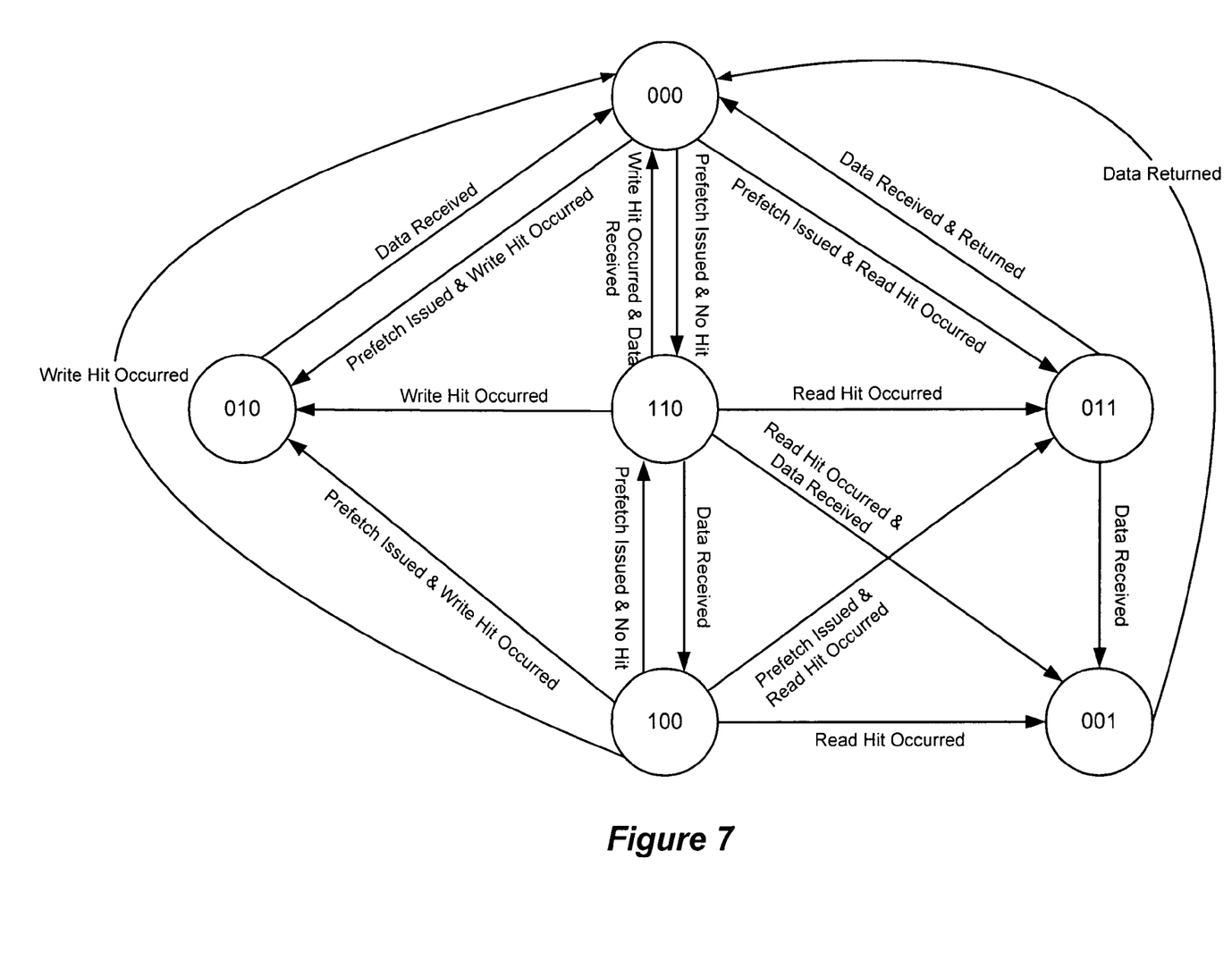
FIG. 7 is state machine representation for the prefetching process shown in FIG. 6.

FIG. 7 is state machine representation for the prefetching process of FIG. 6 with respect to a single prefetch buffer entry. Each state shown in FIG. 7 represents the state of the Valid, In-Flight and Hit flags of a prefetch buffer entry. The edges between the states represent transition between states, and the conditions for those state transitions are indicated in FIG. 7. In an embodiment having a prefetch buffer 118 with N entries 202, the prefetch unit 116 would include N identical and independent state machines, each having a state transition diagram identical to the diagram shown in FIG. 7. The operation of the state machine is best illustrated by example. Note that in other embodiments, the state machine for each prefetch buffer entry may include more or fewer states and furthermore may have different conditions for state transitions.

When a prefetch buffer entry 202 is in state 000, the entry is unused. From this unused state, one of three state transitions can occur: (1) a prefetch is issued and a read hit occurs; (2) a prefetch is issued and no hit occurs; or (3) a prefetch is issued and a write hit occurs. If a prefetch is issued and a write hit occurs, then the prefetch buffer entry will transition from state 000 to state 010.When the prefetch data is received, the prefetch buffer entry transition backs from state 010 back to state 000.The state of a prefetch buffer entry does not change if no event occurs.

If a prefetch is issued and a read hit occurs, then the prefetch buffer entry will transition form state 000 to state 011.When the prefetch data is received and returned to the requester, the prefetch buffer entry transitions back from state 011 to state 000.Otherwise, if the prefetch data is received by the memory controller but not returned immediately to the requester (e.g., because the read hit is preceded by a normal read operation whose processing is not yet complete), the prefetch buffer entry transitions from state 011 to state 001, where it remains until the data is returned to its requester. When the data is returned to its requestor, the prefetch buffer entry transitions from state 001 back to state 000.

If a prefetch is issued and no hit occurs, then the prefetch buffer entry transitions from state 000 to state 110.From state 110, the following five state transition events can occur: (1) a write hit occurs, (2) a read hit occurs; (3) a write hit occurs and the prefetch data is received by the memory controller; (4) a read hit occurs and the prefetch data is received by the memory controller; or (5) no hit occurs and the prefetch data is received by the memory controller.

If a write hit occurs, then the prefetch buffer entry transitions from state 110 to state 010, where it remains until the prefetch data is received. When the prefetch data is received, the state machine transitions back to state 000.

If a read hits occurs and the prefetch data has not yet been received, then the prefetch buffer entry transitions from state 110 to state 011.The prefetch buffer entry transitions from state 011 to state 001 if the prefetch data is received but not returned to the requestor, and transitions (from either state 011 or 001) to back to state 000 when the prefetch data is returned to the requester. If a read hit occurs and prefetch data is received by the memory controller, the prefetch buffer entry transitions directly from state 110 to state 001.

If the prefetch data is received while the prefetch buffer entry is in state 110, and no hits occur, the prefetch buffer entry transitions from state 110 to the nap state 100. From the nap state 100, the state machine can transition to any one of the other states. For example, the prefetch buffer entry transitions from state 100 to state 000 if a write hit occurs. If a read hit occurs, the prefetch buffer entry transitions to state 001,and from there it transitions to state 000 when the prefetch data is returned to the requestor.

The transitions from state 100 to states 010, 110 and 011 are all shortcuts that occur when the prefetch buffer entry is replaced with values for a new prefetch operation. In particular, if there are no unused entries in the prefetch buffer, then an entry in the 100 state (sometimes called the NAP state) is selected by the priority encoder 242 shown in FIG. 4. That entry then transitions to the 110 state if a prefetch is issued and no hit occurs. Note that the issued prefetch here is a different, more recent prefetch, than the one which originally caused the entry to move from state 000 to state 110 and then to state 100. If the newly issued prefetch is accompanied by a write hit, the prefetch buffer entry transitions to state 010, and if the newly issued prefetch is accompanied by a read hit, the prefetch buffer entry transitions to state 011.

The disclosed embodiments provide several advantages over conventional systems and methods, including systems that perform CPU fetches. For example, prefetches issued by the disclosed memory controllers can be performed in systems where the memory bus bandwidth is less than the CPU's memory bus bandwidth, or vice-versa. Also, prefetches issued by the disclosed memory controllers will not interfere with concurrent memory access requests from other subsystems (e.g., graphics, I/O).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the invention and its practical applications, to thereby enable others skilled in the art to best utilize the invention and various embodiments with various modifications as are suited to the particular use contemplated.

What is claimed is:

1. A method of operating a memory system, comprising:
in a memory controller, monitoring memory system activity to detect when the memory system becomes idle;
responsive to such detection:
issuing one or more prefetches for data from the memory controller;
storing in a prefetch buffer an indicator that the data is in-flight;
retrieving the data in response to the one or more prefetches; and
storing the data in a prefetch buffer.

2. The method of claim 1, further comprising:
determining if the prefetch buffer contains a duplicate entry before storing the indicator.

3. The method of claim 1, further comprising:
sending the data to a requestor in order with respect to previous memory access requests.

4. The method of claim 1, further comprising:
determining if a prefetch buffer hit occurs; and responsive to such determination,
issuing one or more prefetches from the memory controller.

5. The method of claim 4, further comprising:
determining if the prefetch buffer contains a duplicate entry before storing the indicator.

6. The method of claim 4, further comprising:
sending the data to a requestor in order with respect to previous memory access requests.

7. The method of claim 1, further comprising:
locking data in the prefetch buffer; and
sending the locked data to a requestor in order with respect to previous memory access requests.

8. The method of claim 1, wherein monitoring memory system activity to detect when the memory system becomes idle includes detecting when a set of memory access request queues are empty.

9. The method of claim 1, wherein monitoring memory system activity to detect when the memory system becomes idle includes detecting when the memory system is not sending transactions corresponding to received memory access requests.

10. A memory controller configured to prefetch data from a memory system, comprising:
a prefetch unit configured to issue one or more prefetches to a memory system in response to the memory system being idle; and
a prefetch buffer coupled to the prefetch unit and configured to store data retrieved by the one or more prefetches, wherein the prefetch buffer includes at least one entry containing information indicating whether the data to be stored in the entry is in-flight.

11. The memory controller of claim 10, wherein the prefetch buffer includes at least one entry containing information indicating whether the data stored in the entry is valid.

12. The memory controller of claim 10, wherein the prefetch buffer includes at least one entry containing information indicating whether data stored in the entry is read hit data.

13. The memory controller of claim 10, wherein the prefetch buffer includes at least one entry containing a prefetch address issued by the prefetch unit.

14. The memory controller of claim 10, further comprising:
hit detection logic for comparing an address of a memory access request with the prefetch address issued by the prefetch unit.

15. The memory controller of claim 14, wherein the hit detection logic generates a prefetch buffer hit signal if the address of the memory access request matches the prefetch address issued by the prefetch unit and the entry contains information indicating that the data stored in the entry is valid.

16. The memory controller of claim 10, wherein the prefetch buffer further comprises at least one entry for storing the data retrieved by an issued prefetch until at least one previous memory access request has returned data to a requestor.

17. The memory controller of claim 16, wherein the prefetch buffer is configured to evict data from a prefetch buffer entry selected for use with a newly issued prefetch.

18. The memory controller of claim 10, wherein the prefetch buffer includes one or more circular queues.

19. The memory controller of claim 10, wherein the prefetch unit is configured to issue one or more prefetches to the memory system in response to a hit on the prefetch buffer.

20. The memory controller of claim 19, wherein the prefetch buffer includes at least one entry containing information indicating whether the data stored in the entry is valid.

21. The memory controller of claim 19, wherein the prefetch buffer includes at least one entry containing information indicating whether data stored in the entry is read hit data.

22. The memory controller of claim 19, wherein the prefetch buffer includes at least one entry containing a prefetch address issued by the prefetch unit.

23. The memory controller of claim 19, further comprising:
hit detection logic for comparing an address of a memory access request with the prefetch address issued by the prefetch unit.

24. The memory controller of claim 23, wherein the hit detection logic is configured to generate a prefetch buffer hit signal if the address of the memory access request matches the pro fetch address issued by the prefetch unit and the entry contains information indicating that the data stored in the entry is valid.

25. The memory controller of claim 19, wherein the prefetch buffer further comprises at least one entry for storing the data retrieved by an issued prefetch until at least one previous memory access request has returned data to a requestor.

26. The memory controller of claim 25, wherein the prefetch buffer is configured to evict data from a prefetch buffer entry selected for use with a newly issued prefetch.

27. The memory controller of claim 19, wherein the prefetch buffer includes one or more circular queues.

28. The memory controller of claim 10, wherein the prefetch buffer includes 32 entries.

29. The memory controller of claim 28, wherein each entry of the prefetch buffer stores 64 bytes of data.

30. The memory controller of claim 10, including logic for detecting when a set of memory access request queues are empty and for indicating a memory system idle condition.

31. The memory controller of claim 10, including logic for detecting when the memory controller is not sending transactions corresponding to received memory access requests and for indicating a memory system idle condition.

32. The memory controller of claim 10, including arbitration logic for detecting a memory system idle condition.

33. A memory controller configured to prefetch data from a memory system, comprising:

prefetch means for issuing one or more prefetches to a memory system in response to the memory system being idle; and buffer means for storing data retrieved by the one or more prefetches, wherein the buffer means includes at least one entry containing information indicating whether the data to be stored in the entry is in-flight.

* * * * *

UNITED STATES PATENT AND TRADEMARK OFFICE
CERTIFICATE OF CORRECTION

PATENT NO.      : 7,370,152 B2
APPLICATION NO. : 10/881413
DATED           : May 6, 2008
INVENTOR(S)     : Woo et al.

Page 1 of 1

It is certified that error appears in the above-identified patent and that said Letters Patent is hereby corrected as shown below:

Column 14, line 46, please delete "pro fetch" and insert -- prefetch --.

Signed and Sealed this

Twenty-ninth Day of July, 2008

JON W. DUDAS
*Director of the United States Patent and Trademark Office*